AUTOMATIC DIGITAL TUNING APPARATUS

Filed Dec. 5, 1966 9 Sheets-Sheet 1

INVENTORS.
ROBERT J. McNAIR
GEORGE BRUCK
SHELDON HOFFMAN

BY Charles M. Hogan
Abraham Ogman
ATTORNEYS.

INVENTORS.
ROBERT J. McNAIR.
GEORGE BRUCK.
SHELDON HOFFMAN

BY Charles M. Hogan
Abraham Ogman
ATTORNEYS.

INVENTORS.
ROBERT J. McNAIR
GEORGE BRUCK
SHELDON HOFFMAN
BY
Charles M. Hogan
Abraham Ogman
ATTORNEYS.

AUTOMATIC DIGITAL TUNING APPARATUS

INVENTORS.
ROBERT J. McNAIR
GEORGE BRUCK
SHELDON HOFFMAN

BY Charles M. Hogan
Abraham Ogman
ATTORNEYS.

CALCULATED INDUCTANCE AND CAPACITANCE PARAMETER VALUES FOR PI NETWORK

| FREQUENCY | INDUCTOR L | CAPACITOR $C_1$ | CAPACITOR $C_2$ |
|---|---|---|---|
| 2.0 mc | 7.65 μh | 990 pf | $5.733C_1$ = 5680 pf |
| 2.5 | 6.12 | 792 | 4544 |
| 3.0 | 5.17 | 660 | 3790 |
| 4.0 | 3.82 | 495 | 2840 |
| 5.0 | 3.06 | 396 | 2270 |
| 6.0 | 2.55 | 330 | 1895 |
| 7.0 | 2.18 | 283 | 1625 |
| 8.0 | 1.91 | 247.5 | 1420 |
| 9.0 | 1.70 | 220 | 1265 |
| 10.0 | 1.53 | 198 | 1136 |
| 11.0 | 1.39 | 180 | 1030 |
| 12.0 | 1.27 | 165 | 946 |
| 13.0 | 1.18 | 152.5 | 875 |
| 14.0 | 1.09 | 141.5 | 811 |
| 15.0 | 1.02 | 132 | 757 |
| 16.0 | 0.956 | 123 | 710 |
| 17.0 | 0.900 | 116.5 | 668 |
| 18.0 | 0.849 | 110 | 632 |
| 19.0 | 0.805 | 104.2 | 598 |
| 20.0 | 0.765 | 99 | 568 |
| 22.0 | 0.695 | 90 | 516 |
| 24.0 | 0.637 | 82.5 | 473 |
| 26.0 | 0.588 | 76.2 | 437 |
| 28.0 | 0.546 | 70.7 | 406 |
| 30.0 | 0.510 | 66 | 378 |

FIG. 11.

INVENTORS.
ROBERT J. McNAIR
GEORGE BRUCK
SHELDON HOFFMAN

BY Charles H. Hogan
Abraham Ogman
ATTORNEYS.

| FREQUENCY | FREQUENCY SELECTOR WIRES | CAPAC. pf | STATE OF CAPACITOR RELAYS |
|---|---|---|---|
| 2.0 mc | 1 0 0 0 0 0 0 0 1 or<br>A $\bar{B}$ $\bar{C}$ $\bar{D}$ $\bar{E}$ $\bar{F}$ $\bar{G}$ $\bar{H}$ I | 990 | 1 1 1 1 0 1 1 1 1 0 |
| 2.1 | 1 0 0 0 0 0 0 1 0 or<br>A $\bar{B}$ $\bar{C}$ $\bar{D}$ $\bar{E}$ $\bar{F}$ $\bar{G}$ H $\bar{I}$ | 942 | 1 1 1 0 1 0 1 1 1 0 |
| 2.2 | 1 0 0 0 0 0 1 0 1 or<br>A $\bar{B}$ $\bar{C}$ $\bar{D}$ $\bar{E}$ $\bar{F}$ G $\bar{H}$ I | 898 | 1 1 1 0 0 0 0 0 1 0 |
| 2.3 | 1 0 0 0 0 1 0 1 1 or<br>A $\bar{B}$ $\bar{C}$ $\bar{D}$ $\bar{E}$ F $\bar{G}$ H I | 858 | 1 1 0 1 0 1 1 0 1 0 |
| 2.4 | 1 0 0 0 0 0 1 1 1 or<br>A $\bar{B}$ $\bar{C}$ $\bar{D}$ $\bar{E}$ $\bar{F}$ G H I | 822 | 1 1 0 0 1 1 0 1 1 0 |
| 2.5 | 1 0 0 0 0 1 1 1 0 or<br>A $\bar{B}$ $\bar{C}$ $\bar{D}$ $\bar{E}$ F G H $\bar{I}$ | 792 | 1 1 0 0 0 1 1 0 0 0 |
| 2.6 | 1 0 0 0 0 1 1 0 1 or<br>A $\bar{B}$ $\bar{C}$ $\bar{D}$ $\bar{E}$ F G $\bar{H}$ I | 763 | 1 0 1 1 1 1 1 0 1 1 |
| 2.7 | 1 0 0 0 0 1 0 1 0 or<br>A $\bar{B}$ $\bar{C}$ $\bar{D}$ $\bar{E}$ F $\bar{G}$ H $\bar{I}$ | 735 | 1 0 1 1 0 1 1 1 1 1 |
| 2.8 | 1 0 0 0 0 0 1 0 0 or<br>A $\bar{B}$ $\bar{C}$ $\bar{D}$ $\bar{E}$ $\bar{F}$ G $\bar{H}$ $\bar{I}$ | 705 | 1 0 1 1 0 0 0 0 0 1 |
| 2.9 | 1 0 0 0 0 1 0 0 0 or<br>A $\bar{B}$ $\bar{C}$ $\bar{D}$ $\bar{E}$ F $\bar{G}$ $\bar{H}$ $\bar{I}$ | 684 | 1 0 1 0 1 0 1 1 0 0 |
| 3.0 | 1 1 0 0 0 0 0 0 1 or<br>A B $\bar{C}$ $\bar{D}$ $\bar{E}$ $\bar{F}$ $\bar{G}$ $\bar{H}$ I | 660 | 1 0 1 0 0 1 0 1 0 0 |
| 3.1 | 1 1 0 0 0 0 0 1 0 or<br>A B $\bar{C}$ $\bar{D}$ $\bar{E}$ $\bar{F}$ $\bar{G}$ H $\bar{I}$ | 634 | 1 0 0 1 1 1 1 0 1 0 |
| 3.2 | 1 1 0 0 0 0 1 0 1 or<br>A B $\bar{C}$ $\bar{D}$ $\bar{E}$ $\bar{F}$ G $\bar{H}$ I | 614 | 1 0 0 1 1 0 0 1 1 0 |
| 3.3 | 1 1 0 0 0 1 0 1 1 or<br>A B $\bar{C}$ $\bar{D}$ $\bar{E}$ F $\bar{G}$ H I | 594 | 1 0 0 1 0 1 0 0 1 0 |
| 3.4 | 1 1 0 0 0 0 1 1 1 or<br>A B $\bar{C}$ $\bar{D}$ $\bar{E}$ $\bar{F}$ G H I | 575 | 1 0 0 0 1 1 1 1 1 1 |
| 3.5 | 1 1 0 0 0 1 1 1 0 or<br>A B $\bar{C}$ $\bar{D}$ $\bar{E}$ F G H $\bar{I}$ | 560 | 1 0 0 0 1 1 0 0 0 0 |
| 3.6 | 1 1 0 0 0 1 1 0 1 or<br>A B $\bar{C}$ $\bar{D}$ $\bar{E}$ F G $\bar{H}$ I | 546 | 1 0 0 0 1 0 0 0 1 0 |
| 3.8 | 1 1 0 0 0 0 1 0 0 or<br>A B $\bar{C}$ $\bar{D}$ $\bar{E}$ $\bar{F}$ G $\bar{H}$ $\bar{I}$ | 520 | 1 0 0 0 0 0 1 0 0 0 |

$2^9 2^8 2^7 2^6 2^5 2^4 2^3 2^2 2^1 2^0$

LEGEND: A "1" in the first digit of the last column means that the 512 or $2^9$ picofarad capacitor is in the tuning network.

FIG. 12A

INVENTORS.
ROBERT J. McNAIR
GEORGE BRUCK
SHELDON HOFFMAN

BY Charles M. Hogan
Abraham Ogman
ATTORNEYS.

AUTOMATIC DIGITAL TUNING APPARATUS

Filed Dec. 5, 1966 9 Sheets-Sheet 7

| mc | FREQUENCY SELECTOR WIRES | CAPAC. pf | CAPACITOR RELAYS |
|---|---|---|---|
| 4.0 | 0 1 1 0 0 0 0 0 1 | 496 | 0 1 1 1 1 1 0 0 0 0 |
| 4.2 | 0 1 1 0 0 0 1 0 1 | 474 | 0 1 1 1 0 1 1 0 1 0 |
| 4.4 | 0 1 1 0 0 0 1 1 1 | 452 | 0 1 1 1 0 0 0 1 0 0 |
| 4.7 | 0 1 1 0 0 1 0 1 0 | 421 | 0 1 1 0 1 0 0 1 0 1 |
| 5.0 | 0 0 1 1 0 0 0 0 1 | 396 | 0 1 1 0 0 0 1 1 0 0 |
| 5.3 | 0 0 1 1 0 1 0 1 1 | 375 | 0 1 0 1 1 1 0 1 1 1 |
| 5.6 | 0 0 1 1 0 1 1 0 1 | 354 | 0 1 0 1 1 0 0 0 1 0 |
| 6.0 | 0 0 0 1 1 0 0 0 1 | 330 | 0 1 0 1 0 0 1 0 1 0 |
| 6.4 | 0 0 0 1 1 0 1 1 1 | 312 | 0 1 0 0 1 1 1 1 1 0 |
| 6.8 | 0 0 0 1 1 0 1 0 0 | 296 | 0 1 0 0 1 0 1 0 0 0 |
| 7.2 | 1 0 0 0 1 0 1 0 1 | 280 | 0 1 0 0 0 1 1 0 0 0 |
| 7.6 | 1 0 0 0 1 1 1 0 1 | 264 | 0 1 0 0 0 0 1 0 0 0 |
| 8.0 | 0 1 0 0 0 0 0 0 1 | 248 | 0 0 1 1 1 1 1 0 0 0 |
| 9.0 | 1 0 1 0 0 0 0 0 1 | 220 | 0 0 1 1 0 1 1 1 0 0 |
| 10.0 | 0 1 0 1 0 0 0 0 1 | 198 | 0 0 1 1 0 0 0 1 1 0 |
| 11.0 | 0 0 1 0 1 0 0 0 1 | 180 | 0 0 1 0 1 1 0 1 0 0 |
| 12.0 | 1 0 0 1 0 0 0 0 1 | 165 | 0 0 1 0 1 0 0 1 0 1 |
| 13.0 | 1 1 0 0 1 0 0 0 1 | 153 | 0 0 1 0 0 1 1 0 0 1 |
| 14.0 | 1 1 1 0 0 0 0 0 1 | 142 | 0 0 1 0 0 0 1 1 1 0 |
| 15.0 | 0 1 1 1 0 0 0 0 1 | 132 | 0 0 1 0 0 0 0 1 0 0 |
| 17.0 | 0 1 0 1 1 0 0 0 1 | 116 | 0 0 0 1 1 1 0 1 0 0 |
| 19.0 | 1 1 0 1 0 0 0 0 1 | 104 | 0 0 0 1 1 0 1 0 0 0 |
| 21.0 | 1 1 1 1 0 0 0 0 1 | 94 | 0 0 0 1 0 1 1 1 1 0 |
| 23.0 | 0 0 1 1 1 0 0 0 1 | 86 | 0 0 0 1 0 1 0 1 1 0 |
| 25.0 | 0 1 0 0 1 0 0 0 1 | 80 | 0 0 0 1 0 1 0 0 0 0 |
| 27.0 | 0 0 0 1 0 0 0 0 1 | 74 | 0 0 0 1 0 0 1 0 1 0 |
| 29.0 | 0 0 0 0 0 0 0 0 1 | 68 | 0 0 0 1 0 0 0 1 0 0 |
| | | | $2^9 2^8 2^7 2^6 2^5 2^4 2^3 2^2 2^1 2^0$ |

FIG. 12B

INVENTORS.
ROBERT J. McNAIR
GEORGE BRUCK
SHELDON HOFFMAN
BY
ATTORNEYS.

MC SELECTOR POSITIONS

| FREQ. WIRE | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|
| A | X | X | O | O | O | X | O | X | O | O | X | X | X | O | X | O | X | X | X | X | O | O | X | O | O | O | O | O |
| B | O | X | X | O | O | O | X | O | X | O | O | X | X | X | O | X | O | X | X | X | X | O | O | X | O | O | O | O |
| C | O | O | X | X | O | O | O | X | O | X | O | O | X | X | X | O | X | O | X | X | X | X | O | O | X | O | O | O |
| D | O | O | O | X | X | O | O | O | X | O | X | O | O | X | X | X | O | X | O | X | X | X | X | O | O | X | O | O |
| E | O | O | O | O | X | X | O | O | O | X | O | X | O | O | X | X | X | O | X | O | X | X | X | X | O | O | X | O |

LEGEND: "X" and "O" indicate binary active and inactive states, respectively

FIG. 13.

100 Kc SELECTOR POSITIONS

| FREQUENCY WIRES | 0 | 1 | 2 | 3 | 4 | 5 | 6 | 7 | 8 | 9 |
|---|---|---|---|---|---|---|---|---|---|---|
| 100 Kc I | X | O | X | X | X | O | X | O | O | O |
| H | O | X | O | X | X | X | O | X | O | O |
| G | O | O | X | O | X | X | X | O | X | O |
| F | O | O | O | X | O | X | X | X | O | X |

LEGEND: "X" and "O" indicate binary active and Inactive states, respectively.

FIG. 14.

INVENTORS.
ROBERT J. McNAIR
GEORGE BRUCK
SHELDON HOFFMAN
BY Charles M. Hogan
Abraham Ogman
ATTORNEYS.

| FREQUENCY | FREQUENCY SELECTOR WIRES AND OUTPUTS PROVIDING PULSES |
|---|---|
| 2 mc. | 1 0 0 0 0 0 0 0 1 |
| 2.1 | 1 0 0 0 0 0 0 1 0 |
| 2.2 | 1 0 0 0 0 0 1 0 1 |
| 2.3 | 1 0 0 0 0 1 0 1 1 |
| 2.4 | 1 0 0 0 0 0 1 1 1 |
| 2.5 | 1 0 0 0 0 1 1 1 0 |
| 2.6 | 1 0 0 0 0 1 1 0 1 |
| 2.7 | 1 0 0 0 0 0 1 0 0 |
| 2.8 | 1 0 0 0 0 0 1 0 0 |
| 2.9 | 1 0 0 0 0 1 0 0 0 |
| 3 | 1 1 0 0 0 0 0 0 1 |
| 3.1 | 1 1 0 0 0 0 0 1 0 |
| 3.2 | 1 1 0 0 0 0 1 0 1 |
| 3.3 | 1 1 0 0 0 1 0 1 1 |
| 3.4 | 1 1 0 0 0 0 1 1 1 |
| 3.5 | 1 1 0 0 0 1 1 1 0 |
| 3.6 | 1 1 0 0 0 1 1 0 1 |
| 3.8 | 1 1 0 0 0 0 1 0 0 |

FIG. 15.

INVENTORS.
ROBERT J. McNAIR
GEORGE BRUCK
SHELDON HOFFMAN
BY Charles M. Hogan
Abraham Ogman
ATTORNEYS.

United States Patent Office 3,509,500

Patented Apr. 28, 1970

3,509,500
AUTOMATIC DIGITAL TUNING APPARATUS

Robert J. McNair, George Bruck, and Sheldon Hoffman, Cincinnati, Ohio, assignors to Avco Corporation, Cincinnati, Ohio, a corporation of Delaware Filed Dec. 5, 1966, Ser. No. 599,096
Int. Cl. H03j *5/00*
U.S. Cl. 334—47 12 Claims

ABSTRACT OF THE DISCLOSURE

The present invention relates to means for tuning the output of a transmitter power amplifier, more specifically to an automatic digital tuning apparatus. The tuning function is accomplished by selecting one tuning parameter such as a capacitance and successively inserting inductors in order of decreasing magnitude in a sequence of steps and monitoring the relative phase of voltage and current entering the tuning network to determine if the inserted inductor is to remain or to be removed from the tuning circuit.

The invention herein shown is also of utility in many other tuned circuit applications of a refined nature and may be employed in transmitter exciter and driver stages and antenna couplers and in radio communications receivers, for example.

The principal object of the invention is to provide a tuning arrangement in which a tuning parameter is selected by digital programming or by successive approximations. A tuning arrangement in which the selection of a parameter of one type is accomplished by digital programming and in which the selection of the parameters of the opposite type is accomplished by successive approximations under the control of decision circuitry will be illustrated. A capacitance is an example of one type of frequency determining parameter and an inductance represents the other type, since tuning networks comprise inductance and capacitance parameters suitably selected to resonate at some desired frequency.

The present invention involves the complication that the various selections must be appropriate to enable the operator to choose any one of a very large number of frequencies to which the network is tuned.

Another object of the invention is to accomplish the aforesaid fundamental purpose with a minimum of numbers of components, with speed and facility, and with maximum utilization of readily available control equipment.

Still another principal object of the invention is to provide decision circuitry for automatically controlling a succession of approximations.

Yet another object of the invention is to provide a closed loop decision network for selecting a tuning parameter.

Still another object of the invention is to provide means for and a method of tuning a resonant circuit by successive trials each accompanied by an evaluation.

Another object of the invention is to provide a resonance tuning means utilizing the relative phase between voltage and current coupled to the resonance tuning means to control successive tuning steps.

For a better understanding of the invention, together with other and further objects, advantages and capabilities thereof, reference is made to the following description of the accompanying drawings, in which.

Figure 7:
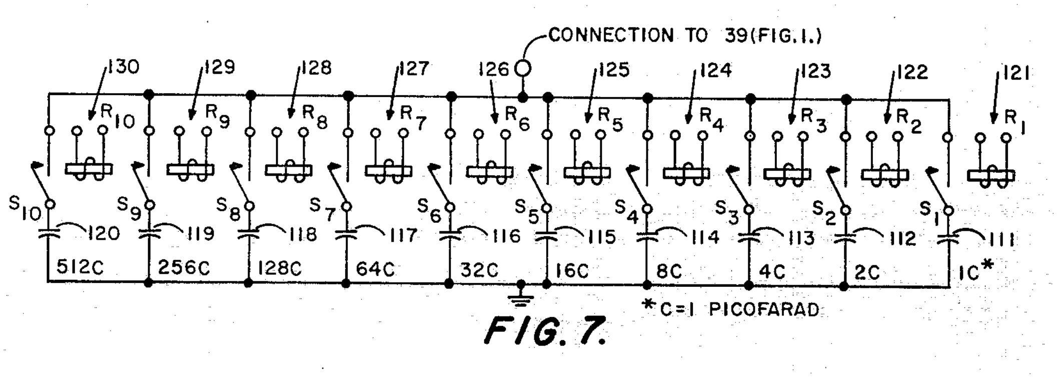
FIGURE 7 is a circuit diagram of the discrete capacitors utilized in making up the capacitance parameter of the tuning system in accordance with the invention.
Figure 10:
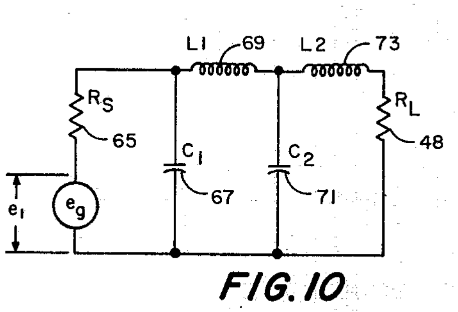
Figures 8, 9:
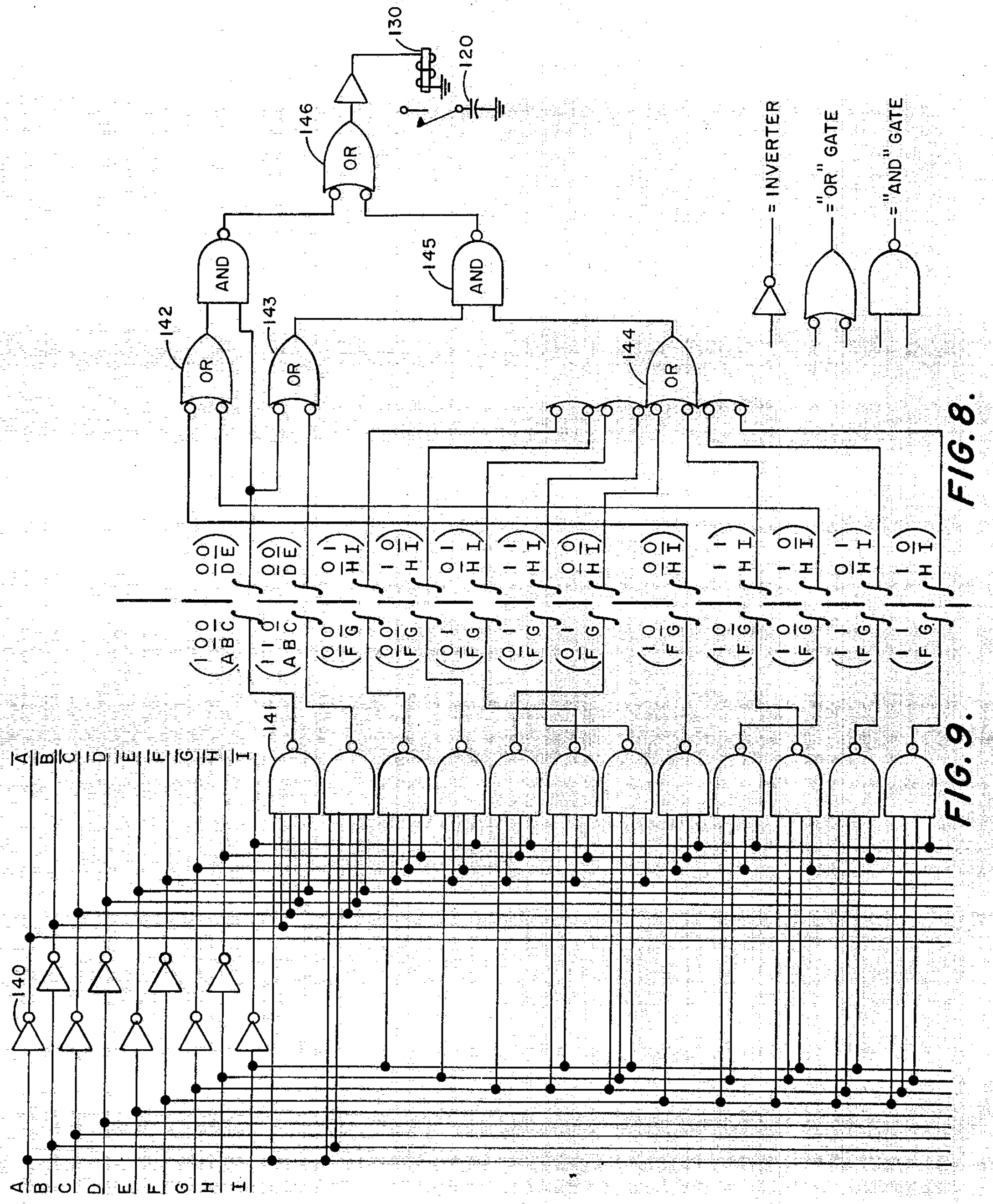

FIGURES 8 and 9, taken collectively, are logic diagrams showing, in representative manner, how the capacitor designated 120 in FIGURE 7 is automatically placed in the tank or tuning circuit when the appropriate frequency selection is made within a representative range of 2 to 3, 8 megacycles;

FIGURE 10 is an equivalent circuit of a Pi-L type network utilized in explaining a modified form of the invention;

FIGURE 11 is a table of frequency versus calculated values of inductance and capacitance for the tuning network;

FIGURE 12 is a table showing how the selected frequency is interpreted in terms of selector wires which in turn control the states of the various capacitors so as to accomplish a programmed digital selection of whatever capacitance parameter is appropriate to any desired frequency;

FIGURES 13 and 14 comprise two tables illustrating the relationships between the frequency selecting wires and the desired frequencies, the first table relating to selection in terms of megacycles and the second relating to the selection in terms of smaller steps; and FIGURE 15 is a similar chart, tabulating the frequency steps between 2 and 3.8 megacycles as well as the states of the frequency selector wires for the various steps, expressed in binary fashion, indicating where output pulses appear in the FIGURE 8 inverters.

By way of background in arriving at an understanding of the forward step in the art represented by the invention, it is called to mind that the output stage of a transmitter incorporates a high-Q network which is tuned to the operating frequency. Transmitters, particularly in military service, are frequently arranged so that any desired frequency within a wide range may be selected. In the case of any frequency change then the output network mentioned above must be retuned. The present invention provides means for automatic tuning whenever a new frequency channel is selected. Tuning is accomplished in the system here shown by utilizing inductive and capacitive elements. The capacitances comprise several discrete components related together, as to magnitude, in accordance with a binary progression. The inductances are also related to each other, as to magnitude, in binary progression. A binary progression is particularly appropriate here because the arithmetic sum of inductance or capacitance arranged in a binary progression is less than the value of the next higher value by the magnitude of the smallest inductance or capacitance— corresponding to the "$2^0$" term in the progression. The automatic selection of the desired capacitance and inductance parameters is accomplished through the use of digital logic.

In accordance with the invention a reactance parameter of one kind, say the capacitance, is selected by a process of programming. That is to say, digital logic derives data from channel selector switches, which data uniquely define a capacitance parameter and are utilized to select whichever of several discrete capacitances alone or together satisfy that parameter. Once the said reactance parameter is selected, the parameter of the opposite kind, in this case the inductance parameter, is selected automatically. Selection of the proper value of inductance to tune the network is accomplished by a successive approximation technique. The inductances are inserted in succession and in sequence. After the insertion of the largest inductance, a test for resonance is made. If a test indicates that the inductance is too large, then it is rejected and the next-largest inductance is inserted. A second test for resonance is made. This process continues until each of the inductances is inserted, but the aggregate value of the inductances accepted or retained in the circuit to be tuned adds up to substantially the value of the inductance parameter required for resonance. Further, in accordance with the invention, the determination of whether or not any given inductor which has been selected is an adequate approximation to the solution of the tuning problem at any particular stage of the approximation is determined by testing for resonance. Specifically, the phase relationship of voltage and current present at the output of the amplifier under consideration is measured. The absence of a capacitive phase differential signifies resonance.

Figure 1:
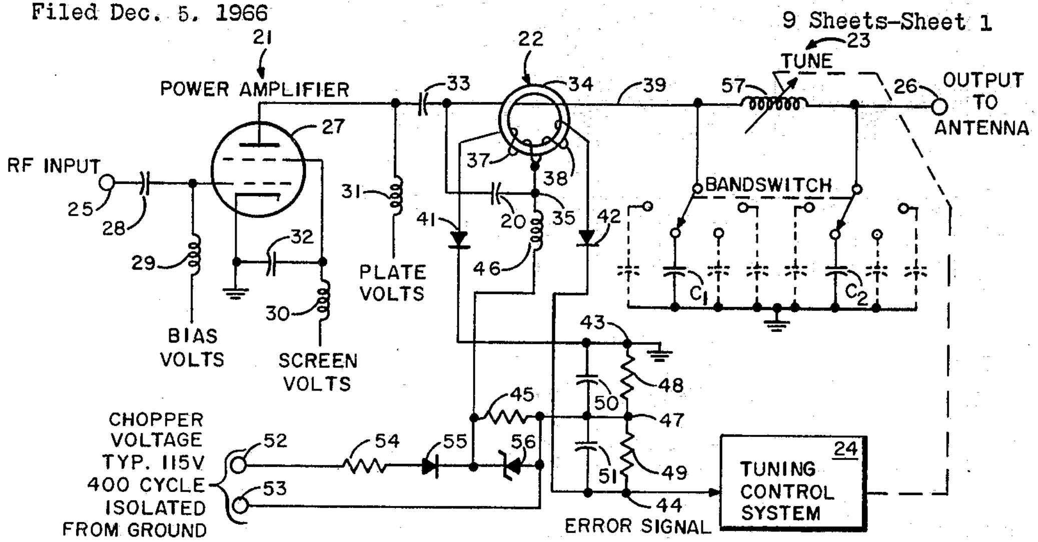
FIGURE 1 is a functional diagram of a tuned amplifier system incorporating a tuning network subsystem in accordance with the invention, this diagram being partially in block form.

In the specific embodiment of the invention herein described the parameters $C_1$ and $C_2$ are variables in the sense that they depend on frequency and each is selected by switching into the tuning network one or more discrete capacitors such as are illustrated in FIGURE 7. However, it is within the purview of the invention to provide a plurality of pairs of capacitors such as those illustrated by dashed lines in FIGURE 1 and to select desired pairs in accordance with frequency, by band switching. Therefore it will be understood that in the description of the preferred embodiment the capacitors illustrated in dashed lines in FIGURE 1 are disregarded.

The preferred embodiment of the present invention is described herein as featuring a Pi-type amplifier tuning network. This configuration is selected by way of illustration and not of limitation. It will be obvious to one of skill in the art, with the teachings of the invention before him, how it may be applied in other tuning circuit configurations. While the output stage of every transmitter in the medium-high power range contains a low loss reactive tuned network, as mentioned above, this network may vary from a simple LC (L standing for inductance and C for capacitance) network to the more complicated Pi network discussed in detail herein to a Pi-L network or a multiple tuned network. The automatic means described herein are of full utility in those environments. It will be understood that the particular parameters and adaptation of the invention in any case depend on such collateral factors as desired band width, degree of automaticity desired, cost and other engineering considerations.

By way of definition, the term "tuning" as employed in this description is addressed to the selection of the several passive and reactive elements of a transmission network (that is, inductors and capacitors) which maximize the curve of power gain versus frequency at some desired point of the frequency spectrum. Conventionally, band pass amplifier networks have a Q range from about 10 to 100, so that the invention is discussed on the footing of linear operation.

Band width may range from a few percent to as much as 20 percent, depending on the coupling networks used. Broad band circuitry suggests the advantage that a specific set of digital programmed components may be retained while operating at any one of several points in the neighborhood of the assigned band.

Referring first to FIGURE 1, there is shown in schematic form the output of a power transmitter system which comprises a tetrode power amplifier 21, a phase discriminator or detector 22 and a tuner 23, together with a tuning control system 24. The modulated radio frequency signals are applied to the radio frequency input 25, amplified, filtered in the tuning network, and, as so processed, appear at an output terminal 26. This discussion assumes single ended operation, but it will be understood that this is not of the essence.

The construction of the amplifier is conventional and details are not significant. The amplifier comprises a tetrode 27 having a control electrode circuit to which the input is capacitively coupled by capacitor 28, biasing being provided from a suitable source of voltage, not shown, through a shunt choke 29. The cathode of the tetrode is grounded. Screen and anode voltages are provided, via suitable chokes 30 and 31, from conventional sources, not shown, the screen being bypassed by a capacitor 32. The anode output of the amplifier is coupled by capacitor 33 to the phase detector and tuning network.

Again, the details of the phase detector 22 are not significant and are conventional. The phase detcetor comprises a magnetic core or toroid 34 on which is wound a center tap secondary comprising a center tap 35 and winding portions 37 and 38. This secondary is inductively coupled by the core to conductor 39, used as a primary. The end leads of the secondary are connected to the anodes of rectifier diodes 41 and 42, the cathodes of which are connected to the end terminals 43 and 44 of a load network. The transformer comprising the toroid 34 and the secondary 37, 38 provides a current sample. A voltage sample is introduced into the phase detector by capacitor 20 which couples the output of the tetrode amplifier system to the center leg of the phase detector which center leg is completed via choke 46 and resistor 45 to the center point 47 of the load network. Now the load network comprising resistors 48 and 49 and capacitors 50 and 51 is characterized by parameters such that the time constant of 51 and 49, for example, is large compared to the period of the carrier but small compared to the period of the highest frequency component of significance anticipated in the phase displacement being measured. Thus an output voltage related in approximately the desired manner to the phase displacement between voltage and current at the input of the tuning network is obtained at point 44.

The operation of the phase detector 22 is common art. It rectifies the sum of the voltage sample and the current sample at the carrier frequency. It also rectifies the difference between the voltage sample and the current sample. It algebraically adds the resulting voltages in order to produce a direct current error signal, effectively at point 44, which is a linear function of phase displacement between the voltage sample and the current sample.

The resistor 45 is in the center leg of the phase detector. It is shunted by Zener diode 56. A zero reference voltage is provided by a chopper (not shown), which is connected to terminals 52 and 53, terminal 52 being in series with resistor 54 and diode 55. The chopper, together with resistor 54 and diode 55 and Zener diode 56, serves to provide a true zero voltage reference or 400 cycle sine wave for the error signal discriminator. The output of the discriminator or phase detector 22 is positive when the voltage vector leads the current vector, negative when the current vector leads the voltage vector, and zero when the current and voltage are in phase. Its output is applied at 44 to the tuning control system 24 for a purpose later to be described in detail, i.e., to control the selection of the lumped inductors, making up the tuning circuit inductance parameter, by successive approximations.

Figure 4:
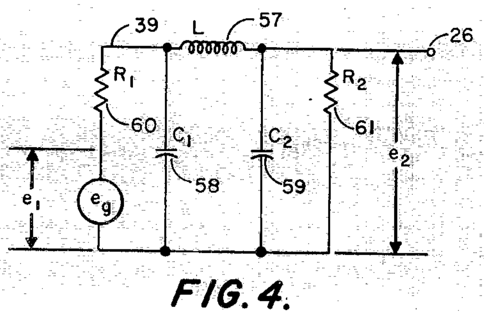
FIGURE 4 is a mathematical model of the single Pi-type network which typifies the tuner herein disclosed in detail, this mathematical model being selected for purposes of illustration and not of limitation.

The discussion now proceeds to the tank circuit or tuning network (FIGURES 1 and 4). In FIGURE 1, the series inductance parameter will be referred to by the reference numeral 57 and the selected shunt capacitance parameters by the reference symbols $C_1$ and $C_2$. The selection of the capacitance parameter in the preferred embodiment involves a choice of one or more discrete capacitors. The selection of the inductance parameter is by successive approximation, under the control of the tuning control system 24 (detailed in FIGURE 2).

Figure 3:
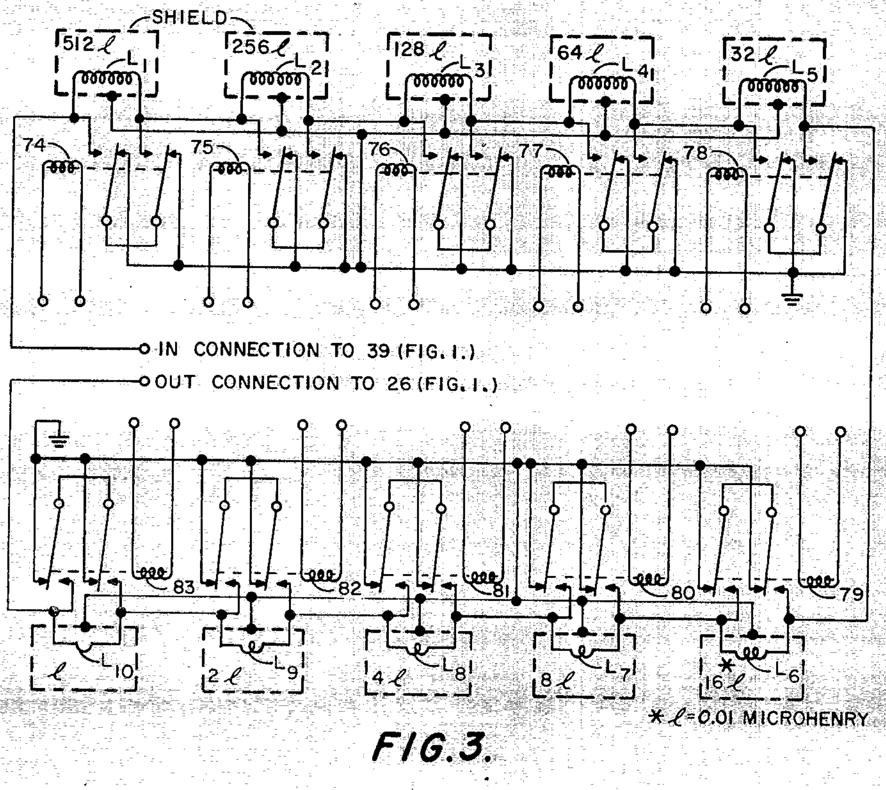
FIGURE 3 is a circuit diagram of a plurality of inductance parameters and immediately associated relays as used to provide the desired inductance parameter network in a tuner in accordance with the invention.

The selected inductance parameter 57 or L comprises one or more of the inductances illustrated in FIGURE 3, and the selected parameter $C_1$ (FIGURE 4) comprises one or more of the capacitances illustrated in FIGURE 7. The capacitance parameter $C_2$ (FIGURE 4) is selected in the same manner as parameter $C_1$, and a drawing of the ingredients used to make up capacitance $C_2$ would be identical to FIGURE 7 (except that $C_2=5.733\times C_1$). That is, one or more capacitances such as are illustrated in FIGURE 7 are selected in like manner to make up the parameter $C_2$. Each capacitor in the composition of $C_2$ has 5.7333 times the magnitude of the corresponding capacitor in the composition of $C_1$. The multiplier 5.733 arises from value selected for $C_1$ and the frequency range of interest. It can and will vary for other assumed conditions.

The Pi-type tuning network of FIGURE 4 comprises not only the reactive parameters but also the input shunt resistance parameter 60 and the output shunt resistive parameter 61. As a preface to the discussion of the transfer functions mentioned below it is pointed out that $e_1$ is the input voltage of the generator, i.e., the tetrode amplifier, and $e_2$ is the output voltage appearing between output terminal 26 and ground. The network herein described covers the range of 2 to 30 megacycles. The series inductance 57 is made up of one or more of a multiplicity of individual inductors illustrated in FIGURE 3. These inductors are as to magnitude related one to the other in a binary sequence. These magnitudes are as follows:

| | Microhenries |
|---|---|
| $L_1$ | 5.12 |
| $L_2$ | 2.56 |
| $L_3$ | 1.28 |
| $L_4$ | 0.64 |
| $L_5$ | 0.32 |
| $L_6$ | 0.16 |
| $L_7$ | 0.08 |
| $L_8$ | 0.04 |
| $L_9$ | 0.02 |
| $L_{10}$ | 0.01 |

The magnitude of the inductors are selected to provide a relatively constant Q over the frequency range of interest. More on this will follow.

The discrete lumped capacitors, making up $C_1$, as illustrated in FIGURE 7, are also related in magnitude in accordance with a binary progression. The operation is such that an operator selects a particular channel by using switches on a control panel (FIGURE 6) thereby causing digital logic to program the specific combination of capacitances which make up the parameters $C_1$ and $C_2$, whereupon the tuning control network system 24 (FIGURE 1, detailed in FIGURE 2) causes to be selected that inductor or those inductors which make up the parameter L. Since the selection of the parameter $C_2$ is accomplished by the same means as the selection of the parameter $C_1$, the discussion is confined to $C_1$.

Figure 2:
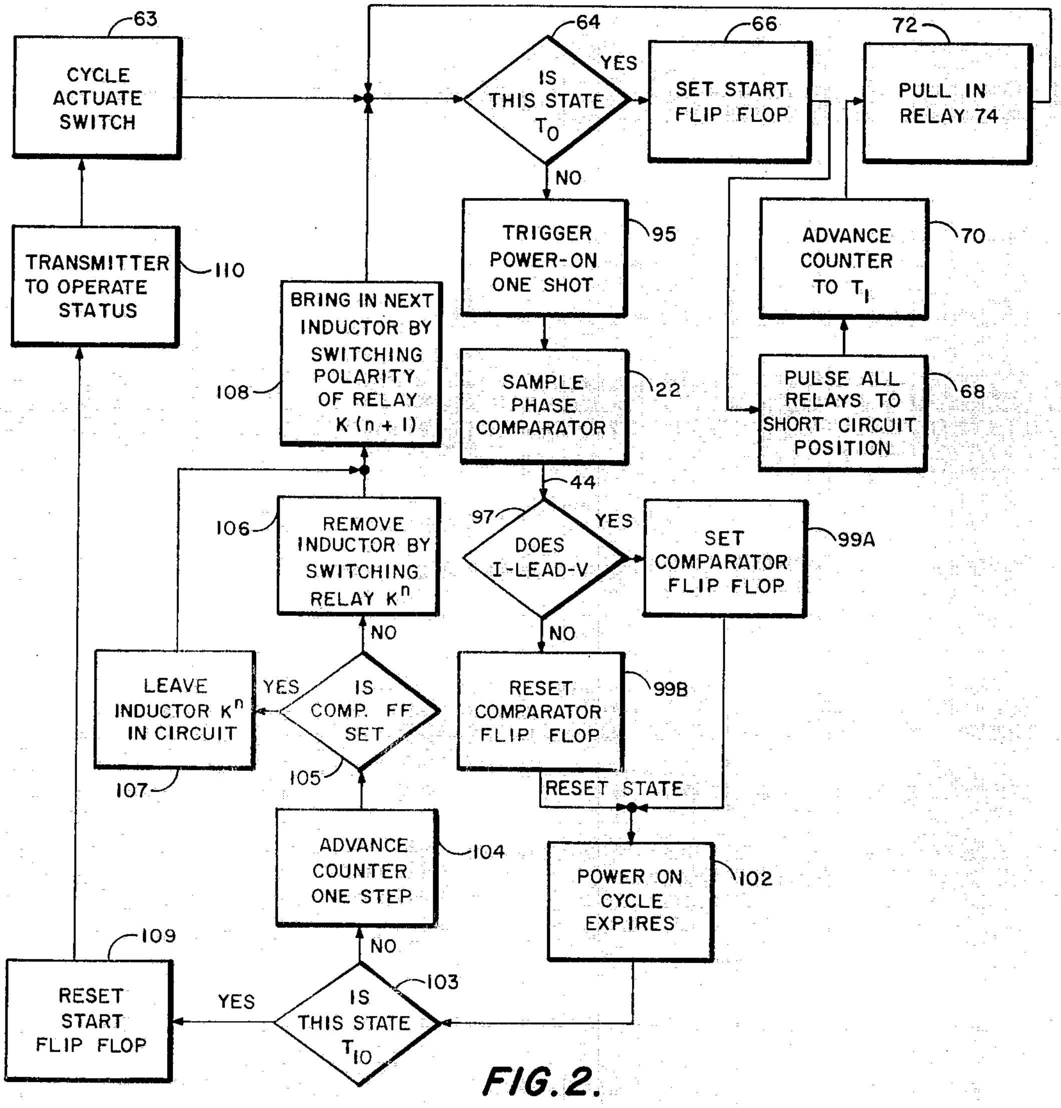
FIGURE 2 is a block diagram of a novel control logic subsystem utilized in the selection of the appropriate inductance parameters.

In FIGURE 2 the various blocks designate a sequence of events. Elements and combinations to perform the requisite functions are per se well known to those skilled in the art so that a detailed description thereof is neither necessary nor desirable. The FIGURE 2 events are executed in the following manner. First, the system is appropriately cycled so as to insert or encircuit each one of the lumped inductors $L_1$–$L_{10}$ (FIGURE 3) successively into the tank circuit or tuning network. Second, following each such insertion the voltage and current at the input of the tuning network are sampled and a phase measurement is made in order to determine whether or not the current leads the voltage. Third, if the current leads the voltage then the tuning network reactance is net capacitive and the inductor which was last inserted in the tuning network is retained therein. On the other hand, if the sampling indicates that the reactance of the tuning circuit is inductive, then the last-inserted lumped inductor is removed from the tuning network by shorting it out. It will be understood that the lumped inductors are thus "tried out" in order of magnitude, the largest-magnitude inductor being tried first. Fourth. the system contains circuitry which establishes ready and reset and "power on" conditions.

In the foregoing description, each inductor is sampled. But it is a feasible alternative to stop the tuning function when resonance is reached and before each and every inductor is sampled.

At the beginning of each operating sequence or complete cycle of the control system a decision network represented by event 64 (FIGURE 2) is in a ready state designated $T_0$. The first step in the cycle of operation involves the events designated 66, 68, 70 and 72 and it is important to note the following: First, that these four events are executed only in a response to an affirmative decision from decision 64; second, that after the first step in the ten-step cycle of operation, which first step involves the pulling of relay 74 (FIGURE 3) and the trial of lumped inductor $L_1$, the events 66, 68, 70 and 72 no longer take place. The execution of event 72 causes the decision network (event 64) to provide a "No" output to flow to event 95 for each check cycle following the first.

Returning now to the description of the beginning of the cycle, the cycle-actuate switch (event 63) serves as a signal input to the decision network (event 64) and a signal from decision network (event 64) sets a start flip flop (event 66). The start flip flop then performs its functions. First it pulses all of the relays 74, 75, 76, 77, 78, 79, 80, 81, 82 and 83 (FIGURE 3) in order to assure that all of the inductor elements $L_1$–$L_{10}$ are shorted out. That is to say, the flip flop sends out a pulse which as applied to logic circuitry, causes event 68 to occur which results in the performance of this shorting function.

Now the sequence of events, commencing with 66, then 68, next produces a pulse which advances a multiple step counter at event 70 at position $T_1$. The counter includes the relay switching network shown in part FIGURE 3. The advance to position $T_1$ causes the relay 74 to be opened whereby the largest lumped inductor $L_1$ (5.12 microhenries in this example) is introduced into the tuning network. That is to say, a pulse from advance counter at event 70 causes the logic at event 72 to remove the short circuit from inductor $L_1$ and render it a part of the tuning network.

The insertion of inductor $L_1$ in the tank circuit is signified by the transmission back to the decision network that the initiate cycle has been completed. Since the system is no longer in the state $T_0$ which characterizes its ready state the decision network now renders a "No" decision and sends out a pulse to a one-shot multivibrator (event 95), the function of which is to cause plate voltage at a reduced power level to be provided at the transmitter final amplifier tetrode 27.

Now let the status of the FIGURE 2 flow diagram be considered at this stage of its operation. The conditions are now as follows: The inductor $L_1$ is in circuit. The revised decision status signified by event 64 has sent out the above-mentioned "No" decision, which as applied to the unit 95 has caused the power to be turned on for a predetermined length of time. That is to say, plate voltage at a reduced power level is provided at the transmitter final tetrode 27. How to utilize a multivibrator for this purpose is per se very common art and need not be described herein. The turning on of the multivibrator brings into operation the phase comparator 22 (detailed in FIGURE 1). Phase comparator 22 samples the phase relationship at the input of the tuning network. That is, after the largest-magnitude inductor $L_1$ is inserted in the tuning network, the phase detector 22 (FIGURE 1) makes a test as to whether or not the the tuning network is in resonance. The phase comparator 22 furnishes to a logical decision network (decision event 97) error voltage data from which the logic network decides whether the current at the input of the turning network leads the voltage. If the answer is affirmative, then an output from decision network causes a comparator to be set (event 99A). If the answer is negative, another output causes the comparator to be reset (event 99B).

At this point, the power supplied to the tetrode 27 is removed. This state occurs at the time of event 102.

Attention is now invited to the decision network symbolized by event 103. The description of operation so far has covered a part of one step of the sequence of operations and there are ten steps in all. The purpose of the decision network at event 103 is to decide when the tenth step has been reached, in which case it furnishes a "Yes" answer to reset the start flip flop (event 109). However, the step under discussion being only the first step, the decision at event 103 is a decision which causes the counter to advance one step (event 104). Parenthetically, the maximum number of steps to which the counter can be advanced is ten.

Now at this point a decision must be made as to whether to leave the inductor $L_1$ in the tuning network or whether to remove it, and therefore a decision network at event 105 makes a decision as to whether the comparator flip flop has been set or reset (events 99A or 99B). If the flip flop has been set, then the inductor $L_1$ should be left in the tuning network. If it has been reset, then the inductor $L_1$ should be removed from the tuning network. The affirmative one of these two possible decisions is communicated to a logic element 107 which functions to leave inductor in the tuning network at event 107. A negative decision functions to take inductor $L_1$ out of the tuning network at event 106. The inductors are designated $L_1$–$L_{10}$ in FIGURE 3. The superscript for $K^n$ in FIGURE 2 designates the inductor being tried. For the first step in the cycle $K^n=L_1$. For the last step $K^n=L_{10}$. In either event, the occurrence of event 106 or 107 activates a logic element which introduces into the tuning network at event 108 the next largest inductor, i.e., number $L_{n+1}$ or $L_2$, thus completing a check cycle sequence. End of sequence is then passed on to the decision network which re-initiates event 64 and causes the power-on and sampling and decision and switching process to be repeated. It will be understood that when the sampling portion of the second step occurs, the sampling may involve either inductor $L_2$ alone or both inductors $L_1$ and $L_2$. The third step of the sampling may involve inductors $L_1$, $L_2$ and $L_3$ or inductors $L_1$ and $L_3$ or inductors $L_2$ and $L_3$ or inductor $L_3$ alone. This process of either accepting or rejecting lumped inductors continues through ten steps, in the manner described. The final trial involves inductor $L_{10}$ either alone or in combination with one or more of the other inductors. At any rate the final result of this successive acceptance or rejection of inductances is a close approximation to the required inductance parameter (within the magnitude of the smallest inductance $L_{10}$) required for tuning at the predetermined desired frequency, because of the ten-step process of successive approximations.

After the completion of the tenth step in the approximation process, that lumped inductor or those lumped inductors, constituting, in the aggregate, the desired parameter, have been inserted in the tuning network and the transmitter should now be ready to operate. Accordingly, the decision network at event 103 sends an affirmative answer to trigger event 109, which resets the start flip flop initially set at event 66 and orders are likewise sent to a logic unit at event 110 which restores the transmitter to an operate status and also cycles the actuate switch at event 63. The entire tuning sequence has now been completed and the system is now in a stand-by condition ready for use.

It has been found that through the use of this technique of successive approximation, the value of the inductance parameter set up by the logic network of FIGURE 2 will be correct to the order of less than one part in a thousand, using the assumed values of inductance.

Referring to FIGURE 3, there are shown ten relays numbered 74–83, inclusive, each comprising a solenoid and a double-pole, double-throw switch arranged in such manner as either to short-circuit, or to incorporate in the tuning network, an associated lumped inductor. In FIGURE 3 there are ten lumped inductors $L_1$–$L_{10}$ inclusive. When the relay contacts are in the position illustrated in FIGURE 3 all of the inductors are inserted in the tuning network and in series, making up an inductance parameter of 10.23 microhenries. That is to say, all of the relays as shown in FIGURE 3 are in the binary "1" state. When any relay is placed in the binary "0" state so that its contacts are in the other of the two possible positions, then the associated inductor is short-circuited or rendered inactive or taken out of the tuning network.

The significance of the expression "1" used in FIGURE 3 is 0.01 microhenry and it will be observed that the values of the various inductors $L_1$—$L_{10}$ are in a binary progression, that is, in accordance with powers of 2, and range from 0.01 microhenry to 5.12 microhenries.

Therefore the inductance parameter 57 of FIGURE 1 is made up of one or more of the inductors $L_1$–$L_{10}$ illustrated in FIGURE 3. The control of the relays 74–83 makes it feasible to obtain any value of the inductance parameter between 0 and 10.23 microhenries in increments of 0.01 microhenry.

In order to prevent intercoupling of the several discrete lumped inductors, which are placed in close proximity to each other, grounded shields are placed around each lumped inductor, as indicated in FIGURE 3. In accordance with the usual practice, in working with frequencies of the order herein involved, care is exercised in the assembly and choice of components because of the fact that lead length and the switch reeds of the relays themselves affect the magnitude of the net inductance of each lumped inductor.

The description now turns to the arrangements by which the capacitance parameters are programmed. The values shown in FIGURE 11 are predetermined by methods well known to those of skill in the art. The description above has already indicated how the inductance parameter variously referred to as "L" (FIGURE 4) or 57 is automatically selected. The description above has further stated that the capacitance parameter $C_1$, also referred to as 58, is selected by programming.

Now the detailed description which follows is directed to the selection of the parameter $C_1$ because the selection of the parameter $C_2$ is by the same means and follows the same method, whereby a description of the one suffices for both.

Before describing the specific technique proposed for programming, the significance of FIGURES 6, 13, 14 and 15 will be discussed.

The frequency selection wires as referred to in FIGURES 6, 12A, 12B, 13 and 14 resemble those disclosed in the publication "Airborne HF SSB/AM System"—ARINC Characteristic No. 533A, issued Mar. 11, 1966, by Aeronautical Radio, Inc., 2551 Riva Road, Annapolis, Md. 21401, specifically at pages 70–72.

Figure 6:
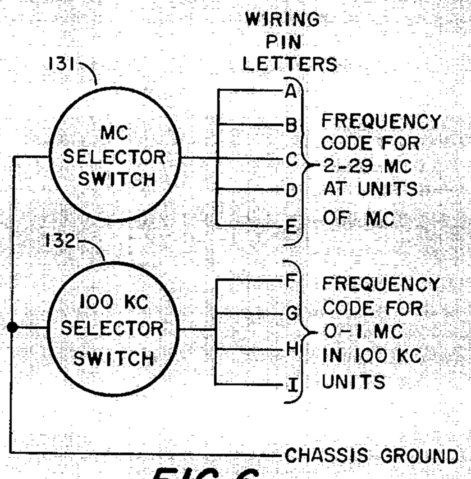
FIGURE 6 is an illustration of a switching subsystem comprising appropriately designated control lines utilized in the selection of a large number of frequencies.

The discussion now proceeds to the tables in FIGURES 13 and 14, which are related to FIGURE 6. Parenthetically, the selector herein employed includes a switch 131 which activates any one of command wires A, B, C, D, E (FIGURE 6) in order to define a desired frequency in terms of megacycles. The control panel further includes a switch 132 which activates any one or more of the wires F, G, H and I, in order to define the desired frequency in 100 kilocycle steps.

The charts in FIGURES 13 and 14 provide a link between frequency and the frequency selection wires. For example, the X will be seen under 2 megacycles and opposite A, which means that the wire A is activated. Similarly, an X will be seen opposite wire I in the zero column for 100 kilocycle steps which means that the wire I is activated. Thus, the tables in FIGURES 13 and 14 check out with the table in FIGURES 12A and 12B. For example, FIGURE 12A shows that for a frequency of 2 megacycles wires A and I are activated. For 2.1 megacycles wires A and H are activated. The wires A–E and F–I in FIGURE 6 are the same as those likewise lettered in FIGURES 12A, 12B, 13 and 14.

Before describing the means by which the programming is accomplished, the relationships among FIGURES 11, 12A and 12B will first be discussed.

Referring further to FIGURE 11, it is a table in which calculated values of the inductance parameter L, the capacitance parameter $C_1$ and the capacitance parameter $C_2$ are tabulated in accordance with the various frequency steps. The inductance L in FIGURE 11 is the parameter 57 in FIGURE 4. Capacitance $C_1$ in FIGURE 11 is the parameter 58 in FIGURE 4. Similarly, the capacitance $C_2$ in FIGURE 11 is the parameter 59 in FIGURE 4.

Now it will be noted that frequency is given in megacycles, inductance in microhenries, and capacitance in picofarads, and that the values of capacitance $C_2$ are 5.733 times the corresponding values of capacitance $C_1$.

Making now a comparison of the third column of FIGURES 12A and 12B and the third column of FIGURE 11, it will be noted that the figures for like frequencies closely correspond and are substantially identical. The reason for the lack of precise identity throughout is the fact that the capacitance parameter in the FIGURES 12A and 12B table is made up of lumped capacitors whose values are related to each other in a binary progression. For example, let there be considered the frequency 8 megacycles in FIGURE 12B. For that frequency the capacitance parameter $C_1$ should be 248 picofarads and that 248 picofarad value is made up in the following fashion:

| Capacitor— | |
|---|---|
| **114**, having a value of $2^3$ ____________picofarads__ | 8 |
| **115**, having a value of $2^4$ ____________do____ | 16 |
| **116**, having a value of $2^5$ ____________do____ | 32 |
| **117**, having a value of $2^6$ ____________do____ | 64 |
| **118**, having a value of $2^7$ ____________do____ | 128 |
| Total ____________________picofarads__ | 248 |

The significance of the binary expression 0011111000 in the fourth column of FIGURE 12B is that the capacitors 114, 115, 116, 117 and 118 are in the tuning network and that the states of the relays 124, 125, 126, 127 and 128 are binary "1." The "0" on the right hand of this expression means that the capacitor 111 having a value of $2^0$ or 1 picofarad is not in the circuit and relay 121 is not closed. The significance of the next "0" is that the capacitor 112 having a value of $2^1$ or 2 picofarads is not in the circuit because relay 122 is not actuated. The significance of the third "0" is that the capacitor 113 having a value of $2^2$ or 4 picofarads is left out by not actuating relay 123. The significance of the adjacent "1" is that the capacitor 114 having a value of $2^3$ or 5 picofarads is in the circuit and so forth. It will be noted that the magnitudes of the ten capacitors are related to each other successively in a binary progression, whereby the value of the capacitor 111 is one picofarad and the value of the capacitor 120 is 512 picofarads. The significance of the charts comprising FIGURES 11 and 12A and 12B is that any desired tuning circuit capacitance parameter within the range from 990 to 66 picofarads for the frequency range of 2–30 megacycles (mc.) can be established by selection codes as shown in the second column of FIGURES 12A–12B which codes put the relays 121–130 (FIGURE 7) in the several combinations of states expressed in binary language in the right hand column of FIGURES 12A and 12B.

Now let there be discussed the selection codes in the second column in FIGURES 12A–12B, the one immediately adjacent the frequencies column. Let there be considered the digital expression 100000001 opposite 2 megacycles. Now correlate these numbers with the frequency selection wires A, B, C, D, E, F, G, H, I. Thus the expression means that certain frequency selector wires A and I (FIGURE 6) are activated (i.e. by simply grounding them) from a control panel. Since, positions of the binary numbers of this expression correspond to the sequence A, B, C, D, E, F, G, H, I, it will be seen from FIGURES 12A and 12B that the desired capacitor relays may be closed and the desired combinations of capacitors introduced in the tuning network to make up the desired capacitance parameter by activating selected ones of selector wires A–I, inclusive.

Let us suppose that the desired frequency is 15 megacycles. Now examining FIGURE 13 it is seen that the first five numbers of the code should be 01110. That is, lines B, C and D should be activated. Examining FIGURE 14, it is found that the next four numbers of the code should be 0001, That is, line I should be activated. Now putting these two sub-codes together, it is found that the composite expression precisely checks with that opposite 15 megacycles in chart 12B. The composite expression for the two subwords is $\overline{A}BCD\overline{EFGH}I$ or, in binary language 011100001. The point of all this is that by programming in terms of the selection of wires in accordance with a digital code for the various frequencies, capacitance control relays can be set up in such state as to make up the desired capacitance parameter.

Now at this point, let the discussion return to the 8 megacycle frequency discussed above which called for 248 picofarads so that the capacitor relays were in states 0011111000. It will be noted that this expression is the binary number corresponding to the radix-ten number 248. The figures in the right hand column of Tables 12A and 12B are simply capacitance values expressed in binary numbers. The positional significance of the various elements in each such number is in terms of ascending powers of 2. By analogy, the capacitance values of the capacitors 111–120, again progressing from right to left, are in terms of ascending powers of 2. The value of capacitor 111 is $2^0$ or 1 picofarad. The value of capacitor 112 is $2^1$ or 2 picofarads and so on.

The code for the selection of the required capacitances which make up $C_1$ is made effective by so positioning the switches 131 and 132 (FIGURE 6), sometimes referred to herein, as to activate the desired ones of the wires A–I. As indicated in FIGURES 12A and 12B, specifically the second column thereof, the digital code there shown comprises binary bits which are in the same sequence as the wires A–I. The code for 2 megacycles is 100000001, for example, which means that wires A and I only are activated. FIGURES 12A and 12B show that there is a code, i.e., a combination of frequency selector wires to be activated, for each frequency. FIGURES 12A and 12B further show that this code is translated into states of the various capacitor relays. The use of switch 131 of FIGURE 6 to activate one or more of the command wires A–E constitutes a gross frequency selection of a broad order of magnitude or range. The use of switch 132 of FIGURE 6 to activate one or more of the command wires F–I constitutes a fine frequency selection of at least one suborder or channel within that range. The last-mentioned selection of frequency is of a narrower or lower order of magnitude.

Again considering the frequency of 2 megacycles, the states of the various capacitor relays are expressed as follows: 1111011110, which means that the 990 picofarads are made up as follows:

| Capacitor No. | State | Magnitude in picofarads |
|---|---|---|
| 120 | 1 | 512 |
| 119 | 1 | 256 |
| 118 | 1 | 128 |
| 117 | 1 | 64 |
| 116 | 0 | |
| 115 | 1 | 16 |
| 114 | 1 | 8 |
| 113 | 1 | 4 |
| 112 | 1 | 2 |
| 111 | 0 | |
| | | 990 |

It will further be noted that the expression 1111011110 is the binary expression for the decimal number 990. This correspondence is due to the fact that all the capacitors are arranged in a binary sequence. It will therefore be understood that the switches 131, 132 (FIGURE 6) establish the digital code illustrated in the second column of FIGURES 12A and 12B and these digital codes in turn cause the capacitor control relays of FIGURE 7 to be set as to activate the required capacitors.

Referring now to the right hand column of FIGURES 12A, 12B, the sequence of the expression for the states of the capacitor relays is the order of diminishing magnitude. Each expression has 10 binary bits, the first of which refers to the largest magnitude capacitor 120, 512 picofarads, and the last of which refers to the smallest magnitude capacitor 111, 1 picofarad.

It will further be noted from FIGURES 12A and 12B that the desired value of the capacitance parameter $C_1$ changes in a pronounced fashion between 2 and 3 megacycles but changes very little between 25 and 29 megacycles. This factor is taken advantage of in the digital control circuit logic in these respects: (1) At the lower frequencies the larger magnitude lumped capacitances are used, they defining substantial steps in magnitude: (2) the smaller capacitors make possible small steps in magnitude where desired.

It will be seen from the foregoing, particularly FIGURES 12A and 12B, that there is a digital code word which uniquely defines each operating frequency and renders the appropriate commands to the capacitor relays. At this point in the specification the query arises as to how the code is utilized to control the capacitor relays, i.e., to switch the capacitors in and to short them out of the tuning network, as required.

In order to avoid unnecessary duplication herein, this discussion is now directed to the 512 or $2^9$ picofarad capacitor 120, the various states of which are signified by the first bit in the right hand column of 12A and 12B. The discussion will further be confined to the frequency range between 2 and 3.8 megacycles and the broad question is now narrowed down to this representative one: How is the largest magnitude capacitor controlled by the code for this frequency span? That being known, those of ordinary skill in the art will know how to construct and use a logic system which controls any desired number of lumped capacitors throughout any practical frequency range, such as that with which the preferred embodiment is concerned. Control logic for controlling capacitor 120 over the frequency range of 2–3.8 megacycles is illustrated in FIGURES 8 and 9.

Referring first to FIGURE 9, it shows the various control wires A, B, C, D, E, F, G, H, I. These supply inputs to inverters such as that numbered 140, the outputs of which provide the logical $\overline{A}$–$\overline{I}$, inclusive. The dash over the letters indicates that the frequency control wires so designated were not activated. At the right hand side of FIGURE 9 will be seen "And" gates such as 141. Appropriate connections are made to the "And" gates so as to set up at the inverter outputs any one of the conditions shown. The outputs of the "And" gates 141 are designated by both the frequency control wires and digital code. The outputs of FIGURE 9 are connected to an "or" gate 142–144 to set up the conditions tabulated in FIGURE 15.

Now suppose that the desired frequency is 2 megacycles. Then the corresponding expression from FIGURE 12A for the frequency selector wires is 100000001. This is the same as 10000 and 0001. This means that wires A and I are activated. This is the same as $A\overline{BCDE}$ and $\overline{FGH}I$. Voltage level or logic states derived frou the network in FIGURE 9 corresponding to $A\overline{BCDE}$ and $\overline{FGH}I$ pass through the "or" gates 143 and 144 and cause a voltage level to be passed through "And" gate 145 which in turn passes through "or" gate 146 and is applied to relay 130 to bring the 512 picofarad capacitor 120 into the turning network. What this means is that the logic code $A\overline{BCDE}$ and $\overline{FGH}I$ has been satisfied so that the capacitor relay is in a "1" condition. FIGURE 6 constitutes an encoding means and selected activated combinations of the output wires there shown represent a frequency defined in terms of a digital code. The outputs A–I of FIGURE 6 are connected to the corresponding inputs on the left side of the control logic illustrated in FIGURES 9 and 8. The output of the control logic system shown in FIGURE 8 is coupled to the capacitor 120. It will be understood that FIGURES 8 and 9 show only that part of the logic system which is applicable to capacitor 120. That is to say, FIGURES 8 and 9 show a logic sub-system. The entire logic system comprises a plurality of sub-systems, one for each of the tuning capacitors 111–120.

FIGURE 15, taken with FIGURES 8 and 9, provide a guide of the requisite conditions for setting up the specific frequencies charted. From the foregoing it will be understood how activation of various combinations of the wires A–I causes the relays to achieve such states as to introduce into the tuning network the lumped capacitors required to provide the capacitance appropriate for the desired frequency.

It will be seen by an inspection of FIGURES 8 and 9 that they provide all of the logic required to put the 512 picofarad capacitor into the tuning network throughout the frequency span from 2 to 3.8 megacycles, during which the fourth column of FIGURE 12A indicates that this capacitor should be in state "1." The same illustrative teachings are employed to put each of the other capacitors in circuit throughout the desired frequency range, as required by the code.

The logical system illustrated in FIGURES 8 and 9 is purely illustrative, it being susceptible to simplification by Boolean operations. Various other methods are well known for translating coded commands, as illustrated in the second column of 12A and 12B, into various relay combinations as called for by the right hand column in those figures.

Those of ordinary skill in the art will immediately recognize that these figures comprise a truth table and that Boolean algebra is employed to determine logic arrangements employed to accomplish the translation. Multivariable Venn diagrams are of utility in such computations. In this connection reference is made to "Digital Computer and Control Engineering," Ledley McGraw-Hill, New York (1960), particularly pages 295–367.

As to the method by which the values in FIGURE 11 may be precalculated note is made of the fact that the mathematical relationships of the Pi-type of network illustrated in FIGURE 4 are per se well known. Five parameters are involved, that is, two resistors, two capacitors, and a coil or inductance. When this network is required to supply maximum power to the load resistor $R_2$ the five components are not independent and the maximum power transfer for the network can occur only at the resonant frequency ($\omega_R$).

Any four of the components are selected freely and then the fifth is computed. As shown in FIGURE 4, the shunt capacitor parameter $C_1$, together with the series inductor L, primarily determines the frequency at which the network tunes, while the second shunt capacitor $C_2$ serves in efficiently transferring power through the network and at the same time it aids in attenuating harmonics. The formulas numbered 1–3 below express the transfer function.

In addition to the five components a variety of other important factors can be introduced, for example: the resonant frequency, $\omega_R$, "Q" of the input section, and "Q" of the output section.

As any one of these values can be computed from the values of four components, they are all interrelated mathematically and a number of these interrelations are listed below:

One useful expression related in many respects to what one would normally call the Q of a circuit, is defined below as $Q_0$. It has the advantage that it enters in a useful manner into some of the formulas and that it approaches conditionally a simple relationship to the input and output Q's.

The reader may note that all formulas become extremely simple if $R_1$ equals $R_2$. Under these conditions the input Q, the output Q, and $Q_0$ become identical; $C_1$ equals $C_2$, etc.

An interesting frequency can also be defined as $\omega_0$ which could be considered as the resonance of just the capacitors and the coil. It is worthy of note that the resonant frequency of the entire circuit including the two resistors is always lower than $\omega_0$.

TABLE 1—MATHEMATICAL COMPUTATION

Definitions $$C=C_1C_2/(C_1+C_2)$$
$$\omega_1=1/(C_1R_1)$$
$$Q_1=\omega_R C_1R_1$$
$$R_0^2=R_1R_2-\omega_R^2L^2$$
$$\omega_0^2=1/(LC)$$
$$\omega_2=1/(C_2R_2)$$
$$Q_2=\omega_R C_2R_2$$
$$Q_0=2\sqrt{R_1R_2}/\omega_R L)$$

Resonance $$\omega_R^2 =\omega_0^2-\omega_1\omega_2=\omega_0 Q_1Q_2/(1+Q_1Q_2)$$
$$=(R_2-R_2)/R_1R_2[C_1^2R_1-C_2^2R_2])=(R_1-R_2)/(L[C_1R_1-C_2R_2])$$
$$=1/_1LC_1)+1/(LC_2)-1/(R_1R_2C_1C_2)$$
$$\omega_R =(R_1-R_2)/L[Q_1-Q_2])$$

Interrelations $$C_1=(1+R_0/R_1)/(\omega_R^2L)$$
$$C_2=(1+R_0/R_2)/(\omega_R^2L)$$
$$C_1/C_2=R_2(R_1+R_0)/[R_1(R_2+R_0)]$$
$$L/(R_1R_2)=(C_1^2R_1-C_2^2R_2)/(C_1R_1-C_2R_2)$$
$$R_1R_2=L/(C_1+C_2-\omega_R^2LC_1C_2)=1/(C_1C_2[\omega_0^2-\omega_R^2])$$

Transfer functions (1)

$$\frac{|e_1^2|}{|e_2^2|}=\frac{R_1}{R_2}\left(\left[\sqrt{R_1/R_2}+\sqrt{R_2/R_1}-\frac{2(Q_1+Q_2)\omega^2}{Q_0\omega^2R}\right]^2+\frac{\omega^2}{\omega^2R}\left[2/Q_0+\left(Q_1\sqrt{\frac{R_2}{R_1}}+Q_2\sqrt{\frac{R_1}{R_2}}\right)\left(1-\frac{\omega^2}{\omega_0^2}\right)\right]^2\right)$$

(2)

$$\frac{|e_1^2|}{|e_2^2|}=\frac{1}{R_2^2}\left([R_1+R_2-\omega^2L(C_1R_1+C_2R_2)]^2+\omega^2[L+R_1R_2(C_1+C_2)-\omega^2LC_1C_2)]^2\right)$$

(3)

$$\frac{|e_1^2|}{|e_2^2|}=\frac{1}{R_2^2}\left(\left[R_1+R_2-\frac{\omega^2}{\omega^2_R}(R_1+R_2+2R_0)\right]^2+\frac{\omega^2}{\omega^2_R}\left[2R_1R_2+R_1R_0+R_2R_0+\omega_R^2L^2+-\frac{\omega^2}{\omega^2_R}(2R_1R_2+R_1R_0+R_2R_0-\omega_R^2L^2)\right]^2\frac{1}{\omega_R^2L^2}\right)$$

(4)

$$\frac{|e_1^2|}{|e_2^2|}=\frac{1}{R_2^2}\left(\left[\left(1-\frac{\omega^2}{\omega_R^2}\right)(R_1+R_2)-2R_0\frac{\omega^2}{\omega_R^2}\right]^2+\frac{\omega^2}{\omega_R^2}\left[\left(1-\frac{\omega^2}{\omega_R^2}\right)\left(\frac{2R_1R_2+R_1R_0+R_2R_0}{\omega_R L}\right)+\frac{(\omega^2+\omega_R^2)L}{\omega_R}\right]^2\right)$$

Figure 5:
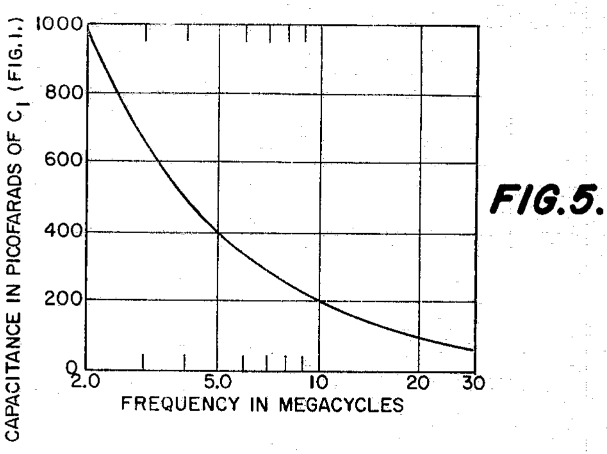
FIGURE 5 is a graph, on a framework of Cartesian coordinates, used as an aid in explaining the operation of the invention and showing the functional relationship between the capacitance parameter in terms of picofarads and the frequency in megacycles.

Using the above formulas, a typical Pi network which maintains a constant—Q over the frequency range of 2 to 30 megacycles may be computed. This is done for a typical implementation wherein $R_1$ (the internal resistance of the plate circuit) is assumed to be 1800 ohms, $R_2$ (the output load) is 50 ohms, and the input loaded—Q is equal to 20. Values of $C_1$ versus frequency for the network shown in FIGURE 4 are graphed in FIGURE 5. It is to be noted that the value of capacitance changes rapidly at the low frequency end of the range and varies but slowly at the high end.

The preferred embodiment herein disclosed receives frequency selection information whereupon the logical system of FIGURE 2 advances from state $T_0$ to state $T_{10}$. It will be obvious to those of skill in the art that the frequency selection apparatus of FIGURE 6 can be made to supply band information, whereupon the FIGURE 2 system could be made to start at some other state such as $T_3$ or $T_7$, for example, depending on the particular portion of the 2 to 30 megacycle spectrum occupied by the particular band of interest. In such instances the elements 70 and 72 of FIGURE 2 should be provided with modifications appropriate to pull in other relays at the start of the cycle of operations, rather than relay 74.

In the event that harmonic suppression in excess of that which can be achieved by a Pi-type tuning network is desired, then a Pi-L network such as that illustrated in FIGURE 10 may be employed. Such a configuration can be readily instrumented in accordance with the invention. The required values of $C_1$ and $C_2$ and the loading inductance $L_2$ of FIGURE 10 can be programmed in the same manner in which $C_1$ and $C_2$ are programmed in accordance with the preferred embodiment of FIGURE 1 and FIGURE 4. The FIGURE 10 network includes the input shunt resistor 65, shunt tuning capacitor 67, series tuning inductor 69, shunt capacitor 71, series loading inductor 73 and shunt output resistor 48. What is involved here is essentially the addition of the loading inductor 73 to the FIGURE 4 network. The foregoing description shows in detail how to program the $C_1$ parameter. It has been stated that the $C_2$ parameter is programmed in the same manner. Likewise, the $L_2$ parameter of FIGURE 10, in that it has already been shown how lumped inductors may be set up in a binary progression.

A vernier type of refinement may be added to the FIGURE 4 embodiment in a manner now described. Again assume a Pi-type tuning network as per FIGURE 4 with inductors per FIGURE 3 and capacitors per FIGURE 7 programmed in the same manner as the preferred embodiment. Now the digital words on the frequency control wires (FIGURE 6) which uniquely define each operating frequency channel can be used not only to select the capacitance parameters by setting up discrete capacitors but they can also be used to set up the series inductance parameter by setting up discrete inductors so that both the capacitance and inductance parameters are established in a manner to approximate those required for resonance conditions.

Now in accordance with the preferred embodiment the phase detector was utilized to make a series of approximations of the required inductance parameter. In the modified form last proposed the discriminator could be utilized to make only one test and to control a servo system which could adjust a variable inductor in order to optimize the inductance parameter and achieve tuning. Alternately, such a discriminator-servo arrangement could be used to vernier in a capacitance adjustment.

The successive approximation technique employed in the preferred embodiment has numerous advantages including the elimination of hunting. The binary progression is continued only to the point at which the smallest increment satisfies the band width criteria to be designed into any system.

The relays employed in the preferred embodiment are, most advantageously, of the latching type, whereby power is not dissipated in holding them in a programmed configuration and further whereby temporary power loss doe not detune the network because of relay drop out. Preferably, all switching of relay contacts is done with carrier power off, whereby contact arcing is minimized and relay switch element reactive effects brought under control.

The invention has the particularly significant significant advantage in that the final stage of a transmitter may very rapidly be tuned, it has been found that the radio frequency carrier can be brought up to rated power within 50 milliseconds from the instant that a frequency is selected in a system using the means and methods for tuning herein disclosed.

While there has been disclosed and described what is considered to be the preferred embodiment of the invention, it will be understood by those skilled in the art that various modifications and changes may be made therein without departing from the scope of the invention as defined in the appended claims.

We claim:

1. In a tuning network of the type adapted to be adjusted to any one of a large number of frequencies and comprising at least one capacitance parameter and at least one inductance parameter, the combination of a plurality of discrete capacitors having magnitudes related to each other in a progression, a plurality of discrete inductors having magnitudes related to each other in a progression, digital program means for selecting and inserting in the tuning network that one capacitor or combination of capacitors appropriate to comprise the capacitance parameter for any desired one of said frequencies, and means for selecting and inserting in the tuning network that one inductor or combination of inductors appropriate to comprise the inductance parameter for that frequency, the last-mentioned selecting and inserting means comprising means for successively inserting the inductors in the tuning network in order of decreasing mangitude, in a sequence of steps, means for determining the relative phase of voltage and current entering said tuning network at the end of each step in order to indicate whether the inserted inductor should be retained in circuit or eliminated, and decision means responsive to said indication to switch out of the tuning circuit any inductor which is rejected and to retain in the tuning network any inductor which should be retained, whereby the desired tuning condition is approached by a series of approximations.

2. The combination in accordance with claim 1 in which the discrete capacitors are related in a binary progression.

3. The combination in accordance with claim 2 in which the discrete inductors are related in a binary progression.

4. The combination in accordance with claim 3 in which the inductors are connected in series, and relays for individually short-circuiting said inductors for the purpose of removing them individually from the tuning network.

5. The combination in accordance with claim 4 in which the digital program means comprises a plurality of command wires activated in various combinations to provide frequency selections in accordance with frequency of an order of magnitude and at least one suborder of magnitude lower so that any combination of wires activated represents a frequency defined in terms of a digital code, and a control logic system having inputs coupled to said wires and outputs coupled to said capacitors so as to respond to the code to insert in the tuning network the desired one or more lumped capacitances which make up the capacitance parameter.

6. In a tuning network of the type adapted to be adjusted to any one of a large number of frequencies and comprising at least one reactive parameter of one kind and at least one reactive parameter of the opposite kind, the combination of a plurality of discrete lumped reactive units of the first kind and having magnitudes related to each other in a binary progression, a plurality of lumped reactive units of the second kind and having magnitudes related to each other in a binary progression, digital program means for selecting and inserting in the tuning network that one or more lumped reactive units of the first kind appropriate to comprise the first-mentioned parameter for any desired one of said frequencies, and trial and error means for selecting and inserting in the tuning network that one or more lumped reactive units of the second kind appropriate to comprise the second-mentioned parameter for that frequency, the trial-and-error means comprising means for successively inserting said reactive units of the second kind in the tuning network in order of decreasing magnitude in a sequence of steps, means for determining the relative phase of voltage and current entering said tuning network at the end of each step, and means responsive to said relative phase for retaining or removing each selected reactive unit whereby the desired tuning conditions are approached by a series of approximations.

7. A method of tuning a circuit containing a capacitive reactance parameter and an inductive reactance parameter to resonance, comprising the steps of:

(a) inserting a predetermined magnitude of one of said reactance parameters;

(b) providing the other reactance parameter as a plurality of discrete related reactances in a progression where the difference between the magnitude of one reactance in the progression and the sum of the magnitude of all reactances in the progression, of lower value than said one reactance, equals a constant;

(c) inserting each of said discrete reactances in sequence starting with the reactance having the largest magnitude;

(d) generating a signal responsive to the phase difference between voltage and current samples in the circuit being tuned; and (e) retaining a discrete reactance that should be retained and switching out a discrete reactance that should be eliminated in response to said signal.

8. A method of tuning a circuit to resonance as described in claim 7 in which said progression is a binary progression.

9. A method of tuning a circuit to resonance as described in claim 7 in which the plurality of reactances are inductive.

10. A method of tuning a circuit to resonance as described in claim 7 which includes in addition providing digital frequency selecting means and circuit means for correlating said digital frequency selecting means to said one reactance parameter for encircuiting said predetermined magnitude of said one reactance parameter.

11. A method of tuning a circuit to resonance as described in claim 7 in which said one reactance parameter is also a plurality of discrete related reactances in a progression where the difference between the magnitude of one reactance in the progression and the sum of the magnitude of all reactances in the progression of lower value than said one reactance equals a constant.

12. A method of tuning a circuit to resonance as described in claim 11 which includes in addition providing digital frequency selecting means and circuit means for correlating said digital frequency selecting means to said one reactance parameter for encircuiting discrete reactances making up the one reactance parameter singly and in combination.

References Cited

UNITED STATES PATENTS

| | | | |
|---|---|---|---|
| 3,390,337 | 6/1968 | Beitman | 333—17 X |
| 2,505,511 | 4/1950 | Vogel | 333—17 |
| 2,776,405 | 1/1957 | Moore et al. | 324—73 |
| 2,824,220 | 2/1958 | Epperson | 325—177 |
| 2,827,567 | 3/1958 | White | 331—179 X |
| 2,981,902 | 4/1961 | Familier | 333—17 |
| 3,054,057 | 9/1962 | Bettin et al. | 325—383 |
| 3,160,832 | 12/1964 | Beitman, et al. | 333—17 |
| 3,166,726 | 1/1965 | Jensen et al. | 334—19 |
| 3,191,134 | 6/1965 | Stillwater | 334—25 X |
| 3,349,350 | 10/1967 | Rittenbach | 334—47 |
| 3,355,667 | 11/1967 | Bruene | 333—17 X |

HERMAN KARL SAALBACH, Primary Examiner

WM. N. PUNTER, Assistant Examiner

U.S. Cl. X.R.

324—73; 325—177, 174; 333—17; 334—65